United States Patent [19]

Kudo et al.

[11] Patent Number: 5,148,335
[45] Date of Patent: Sep. 15, 1992

[54] MULTILEVEL OPTICAL RECORDING ARRANGEMENT

[75] Inventors: Toshio Kudo; Toshiaki Niitsu, both of Tokyo, Japan

[73] Assignee: Casio Computer Co., Ltd., Tokyo, Japan

[21] Appl. No.: 522,502

[22] Filed: May 10, 1990

Related U.S. Application Data

[63] Continuation of Ser. No. 443,080, Nov. 27, 1989, abandoned, which is a continuation of Ser. No. 170,722, Mar. 21, 1988, abandoned.

[30] Foreign Application Priority Data

Mar. 25, 1987 [JP] Japan .................. 62-69160
Mar. 19, 1988 [JP] Japan .................. 63-66781

[51] Int. Cl.$^5$ ................................. G11B 5/02
[52] U.S. Cl. ................................. 369/59
[58] Field of Search ........................... 369/59

[56] References Cited

U.S. PATENT DOCUMENTS

| | | | |
|---|---|---|---|
| 3,946,367 | 3/1976 | Wohlmut et al. | 369/94 |
| 4,090,031 | 5/1978 | Russell | 369/108 |
| 4,152,726 | 5/1979 | Kojima et al. | 369/116 |
| 4,375,096 | 2/1983 | Gorog et al. | 369/102 |
| 4,426,693 | 1/1984 | Satoh et al. | 369/116 |
| 4,467,383 | 8/1984 | Ohta et al. | |
| 4,525,822 | 6/1985 | Nishimura | 369/59 |
| 4,574,366 | 3/1986 | Potember et al. | 365/127 |
| 4,612,587 | 9/1986 | Kaneko et al. | 369/13 |
| 4,701,609 | 10/1987 | Koishi et al. | 369/116 |
| 4,711,815 | 12/1987 | Yoshike | |
| 4,740,943 | 4/1988 | Davidson et al. | 369/59 |
| 4,771,347 | 9/1988 | Horimai et al. | 369/13 |
| 4,773,060 | 9/1988 | Shimada et al. | 365/122 |

FOREIGN PATENT DOCUMENTS 2528215 6/1983 France .
58-166546 10/1983 Japan .
2122408 1/1984 United Kingdom .

OTHER PUBLICATIONS

Tseng, S. C., IBM TDB, "Encoding Schemes for Video Disks", vol. 24, No. 3, Aug. 1981.

Primary Examiner—Vincent P. Canney
Attorney, Agent, or Firm—Frishauf, Holtz, Goodman & Woodward

[57] ABSTRACT

When information is recorded by emitting a laser beam from a laser beam source, focusing the laser beam to irradiate a recording layer of an information recording medium, and changing the optical characteristics of the irradiated portion of the information recording medium, an information signal is converted by a recording signal generator into a multilevel recording signal, and the output power of the laser beam to irradiate the recording layer of the recording medium is changed by a modulating unit in a multilevel manner in accordance with the recording signal. Therefore, a portion having different optical characteristics from those of a portion not irradiated with the laser beam is formed in the recording layer.

24 Claims, 10 Drawing Sheets

MULTILEVEL OPTICAL RECORDING ARRANGEMENT

This application is a continuation of application Ser. No. 07/443,080, filed Nov. 27, 1989, now abandoned which is a continuation of application Ser. No. 07/170,722, filed Mar. 21, 1988, now abandoned.

BACKGROUND OF THE INVENTION

1. Field of the Invention

The present invention relates to a method of recording information by irradiating an optical information recording medium such as an optical disk with an optical beam such as a laser beam and changing the optical characteristics of an optical disk portion irradiated with the optical beam, and an apparatus therefor.

2. Description of Related Art

An optical information recording medium such as an optical disk normally has a substrate and a recording layer formed on the substrate. When the recording layer is irradiated with an optical beam, the optical characteristics of the portion irradiated with the optical beam are changed and thus information is recorded. As a recording mechanism used for recording information in accordance with this method, the following four mechanisms are conventionally known:

(1) The recording layer is made of a metal which can be easily fused. The recording layer is irradiated with an optical beam, and its portion irradiated with the optical beam is fused by the heat of the optical beam to form pits. Information is thus recorded.

(2) The recording layer is made of a magnetic material. The recording layer is irradiated with an optical beam, and the direction of magnetization of the portion irradiated with the optical beam is inverted by an external magnetic field. Information is thus recorded.

(3) The recording layer is made of a material which can be phase-transited between, e.g., crystalline and amorphous phases. The recording layer is irradiated with an optical beam, and phase transition is caused at its portion irradiated with the optical beam. Information is thus recorded.

(4) The recording layer is made of an organic material. The recording layer is irradiated with an optical beam, and the molecular structure of its portion irradiated with the optical beam is changed. Information is thus recorded.

Figure 1:
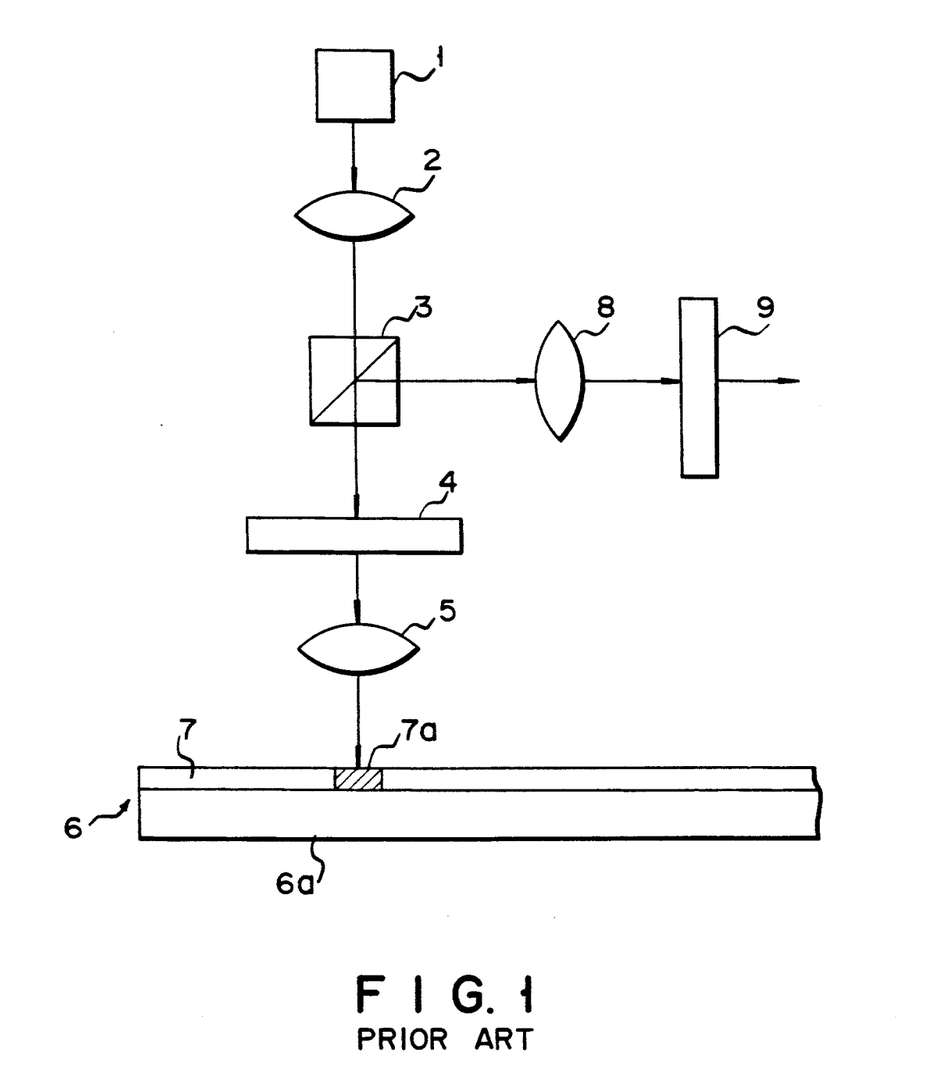
FIG. 1 schematically shows the arrangement of an example of a conventional optical information recording apparatus.

Among these, mechanism (1) is used most widely. When information is to be recorded in accordance with this mechanism, the apparatus shown in FIG. 1 is used. When information is to be recorded on optical disk 6 by the apparatus shown in FIG. 1, as disk 6 is rotated at a predetermined speed, a laser pulse is emitted from laser beam source 1 in accordance with the information to be recorded which is supplied from a signal processor (not shown). The laser pulse is converted into a collimated beam by lens 2. The collimated beam passes through polarizing beam splitter 3 and λ/4 plate 4, and focused by focusing lens 5 to irradiate recording layer 7 formed on substrate 6a of disk 6. Laser pulse irradiated portion 7a is fused to form a pit.

When information is to be read out, a continuous optical laser beam of a lower output power than that in the case of information recording is emitted from laser source 1. The laser beam reflected by recording layer 7 passes lens 5 and λ/4 plate 4, is reflected by beam splitter 3, and is focused by focusing lens 8 toward optical detector 9. The intensity of the reflected light is detected by detector 9, and an obtained detection signal is supplied to a signal processor (not shown) to reproduce the recorded information.

Figure 2:
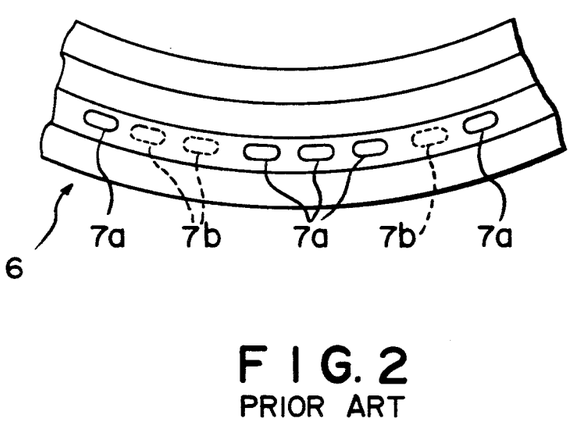
FIG. 2 shows recording portions corresponding to digital signals and formed in a conventional optical disk.

In the recording apparatus described above, when information to be recorded is digital information, the output timing of the laser pulses has a predetermined period. Whether a laser pulse is to be actually output or not is controlled in accordance with whether the digital information is binary "1" or "0". More specifically, portions of optical disk 6 corresponding to "1" are recording pits 7a having the substantially same shape, and those corresponding to "0" are non-pit portions 7b indicated by broken lines, as shown in FIG. 2. Assuming that a pit is formed even in each non-pit portion 7b, the pitches between the pits become the same.

Figure 3:
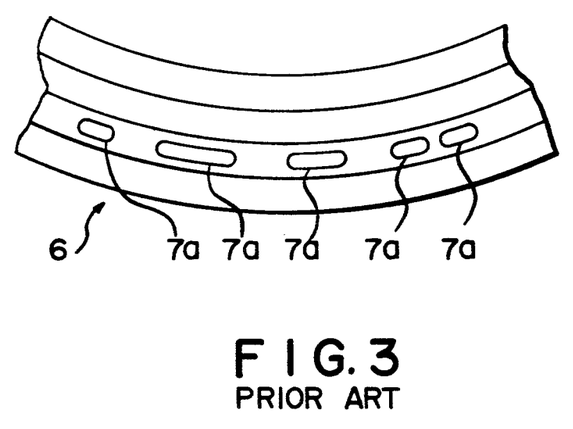
FIG. 3 shows recorded portions corresponding to analog signals and formed in a conventional optical disk.

When information to be recorded is analog information, the length and interval of the laser pulses to be output ar changed in accordance with the information. Pits 7a are formed such that both their shapes and pitches between adjacent pits are different, as shown in FIG. 3.

When an optical disk uses the recording mechanisms (2) to (4), recording apparatuses similar to that described above are used.

Recently, however, high-density recording must be performed on an information recording medium. In this case, with the conventional recording method described above, the recording density is sometimes insufficient.

SUMMARY OF THE INVENTION

It is an object of the present invention to provide a method of recording information on an optical information recording medium at a high density and an apparatus therefor.

According to the present invention, there is provided a method of selectively irradiating an information recording medium with an optical beam to form a recorded portion having different optical characteristics from those of a beam non-irradiated portion, thereby recording information, wherein an output power of the optical beam irradiating the information recording medium is changed in a multilevel manner in accordance with information to be recorded in order to change the optical characteristics of the recorded portion of the information recording medium in a multilevel manner, thereby recording information.

According to the present invention, there is also provided an optical information recording apparatus comprising: (a recording signal output means for outputting an information signal to be recorded in the form of a recording signal obtained by converting the information signal into a plurality of signal levels; (b) optical beam output means driven by the recording signal output from the recording signal output means, for outputting an optical beam of an output power corresponding to the recording signal; and (c) optical means for focusing the optical beam output from the optical beam output means onto an information recording medium on which information is to be recorded.

According to the present invention, since the output power of the optical beam is changed in a multi-level manner as described above, the optical characteristics of the recorded portion of the information recording medium are changed in a multilevel manner. Therefore, the information density can be increased compared to the conventional recording method wherein information is recorded merely by means of two levels corresponding to recorded and non-recorded portions.

DETAILED DESCRIPTION OF THE PREFERRED EMBODIMENTS

Figure 4:
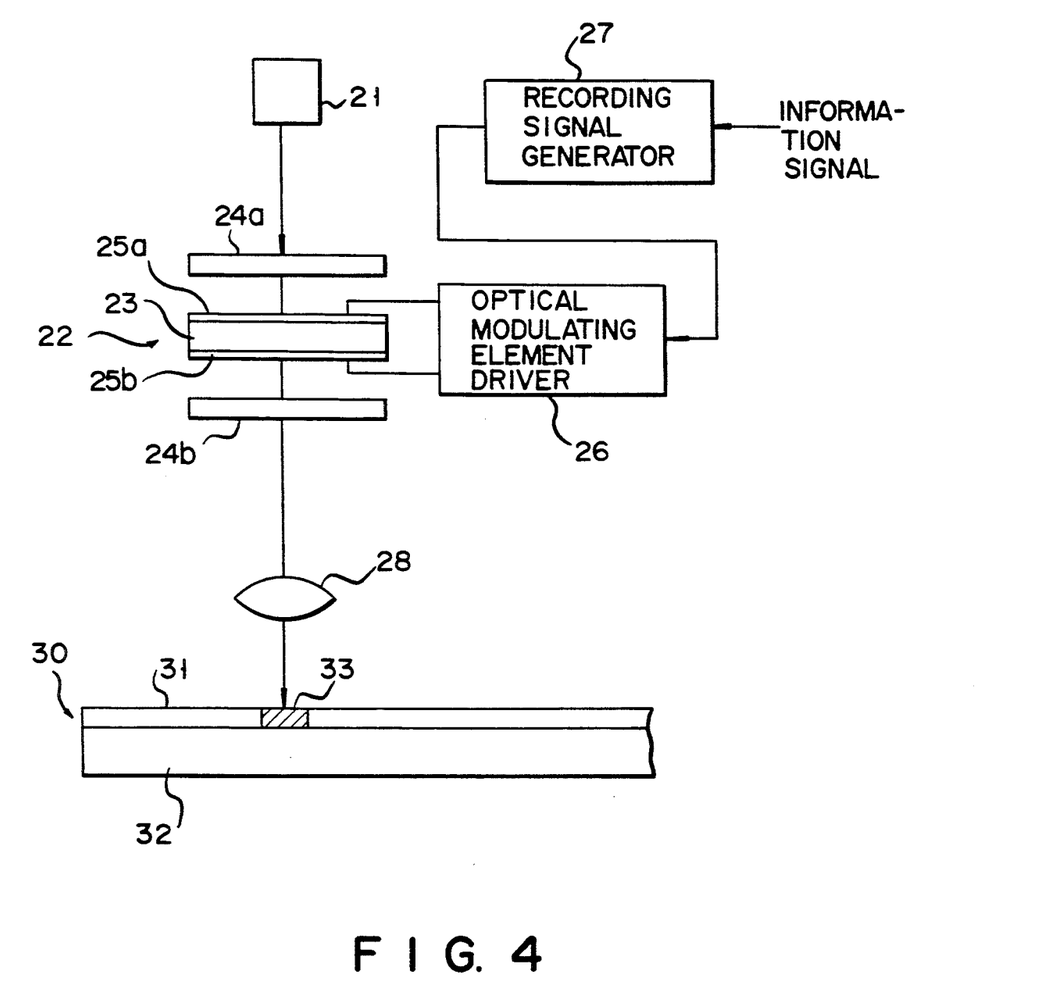
FIG. 4 schematically shows the arrangement of an optical information recording apparatus according to an embodiment of the present invention.

Preferred embodiments of the present invention will be described in detail with reference to the accompanying drawings. FIG. 4 schematically shows an arrangement of an optical information recording apparatus according to an embodiment of the present invention. Referring to FIG. 4, reference numeral 21 denotes a laser beam source. Any conventionally known laser can be used as laser beam source 21, but a semiconductor laser is preferably used so that the unit can be made compact. An AlGaAs diode laser having a wavelength in the range of 730 nm to 870 nm is suitable as the semiconductor laser. The output power of the laser beam emitted from beam source 21 set to have a predetermined output power is modulated by modulator 22. Modulator 22 has optical modulating element 23 and a pair of polarizing plates 24a and 24b provided above and under element 23. Optical modulating element 23 can change the laser beam transmittance and is made of a ferroelectric material such as PLZT having a light translucent property. Modulating element 23 is connected to optical modulating element driver 26 (to be described later) through a pair of electrodes 25a and 25b formed on its upper and lower surfaces. Electrodes 25a and 25b are preferably flat. Although a pair of electrodes are provided on the two surfaces of element 23, they can be provided on either surface. In this case, it is preferable that each electrode has an interdigital structure.

Recording signal generator 27 generates a recording signal in accordance with an input information signal and outputs it to optical modulating element driver 26 described above. The recording signal has a plurality of signal levels as will be described later. The recording signal is amplified by driver 26 and output to modulating element 23 through electrodes 25a and 25b. Upon reception of the drive signal, modulating element 23 changes the transmitted amount of laser beam from source 21 in accordance with the drive signal. Note that when the recording signal generated by generator 27 is sufficient for driving the modulating element 23, driver 26 can be omitted.

Optical disk 30 as a information recording medium is rotatably provided under modulator 22. Optical disk 30 consists of substrate 32 and recording layer 31 formed on substrate 32. Substrate 32 is made of a material having a high optical transmittance, e.g., glass, an acrylic resin, or a polycarbonate resin, so that the laser beam is effectively passed therethrough when information is to be read out in the manner to be described later. Recording layer 31 is made of a specific material for the following object. More specifically, when recording layer 31 is irradiated with a laser beam, a portion having different optical characteristics from those of a non-irradiated portion must be formed in the laser beam irradiated portion, the optical characteristics of the non-irradiated portion must be changed by the output of the emitted laser beam (to be described later in detail). A laser beam having an output power modulated by modulator 22 in accordance with the information signal is focused by focusing lens 28 onto recording layer 31, and recorded portion 33 having optical characteristics corresponding to the laser beam output power is formed in recording layer 31.

Figure 5:
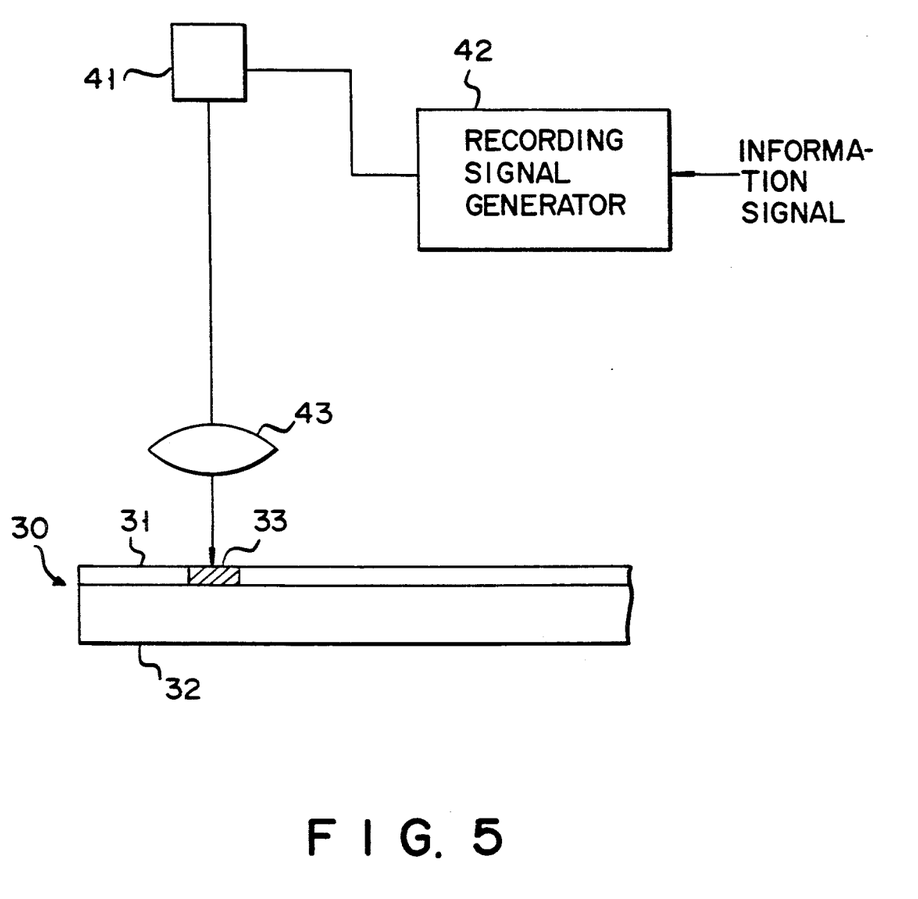
FIG. 5 schematically shows the arrangement of an optical information recording apparatus according to another embodiment of the present invention.

FIG. 5 schematically shows an arrangement of an optical information recording apparatus according to another embodiment of the present invention. Referring to FIG. 5, reference numeral 41 denotes laser beam source which can adjust the output power of the laser beam to be emitted, for example can use the semiconductor laser such as an AlGaAs diode laser described above. Laser beam source 41 is connected to recording signal generator 42. Recording signal generator 42 generates a recording signal in accordance with an input information signal and outputs the recording signal to source 41 in the same manner as recording signal generator 27 described above. The recording signal is at the same voltage level as the signal generated by generator 27, when laser beam source 41 is of voltage-driven type. It has a plurality of current levels when light source 41 is of current-driven type. The output power of the laser beam emitted from beam source 41 is controlled by the recording signal. The laser beam output from beam source 41 in this manner is focused by focusing lens 43 onto recording layer 31 of optical disk 30. Recorded portion 33 corresponding to the laser beam output is formed in recording layer 31 in the same manner as in the embodiment described above.

Recording signal generator will be described in detail. Recording signal generator 42 is identical in structure to recording signal generator 27 when laser beam source 41 is of the voltage-driven type. When laser beam source 41 is of the current-driven type, generator 42 is different from generator 27 only in that a current selector is used in place of the voltage selector employed in generator 27. Hence, only generator 27 will be described in detail.

Figure 6:
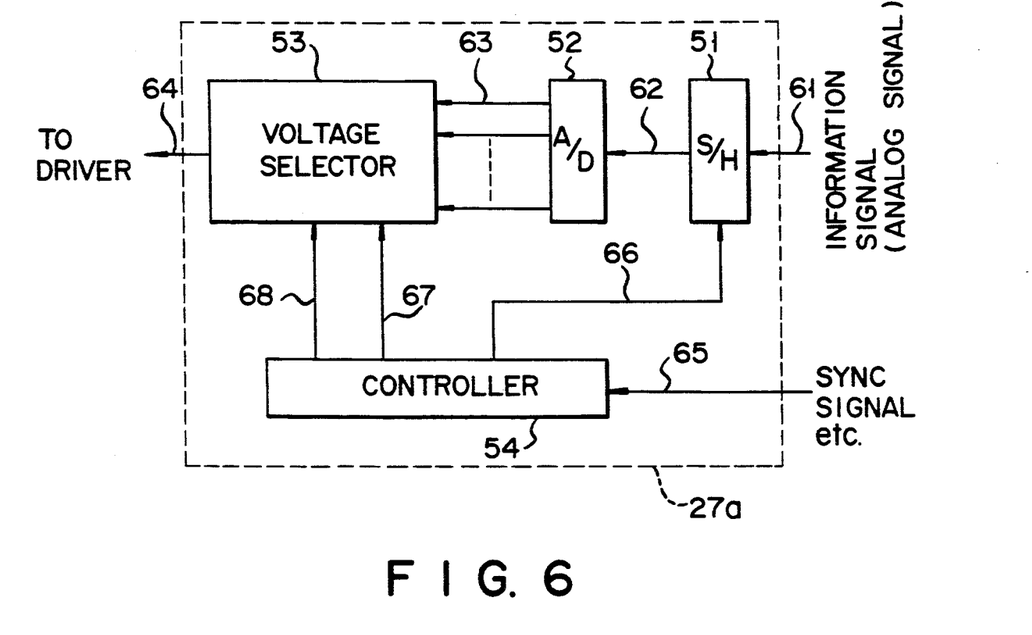
FIGS. 6 and 7 schematically show recording signal generators, respectively.

A case wherein the input information signal is an analog signal will be described with reference to FIG. 6. In this case, recording signal generator 27a comprises sample/hold (S/H) circuit 51, A/D converter 52, voltage selector 53, and controller 54. S/H circuit 51 samples information signal 61 in accordance with sampling signal 66 having a predetermined cycle and output from controller 54 and holds the sampled signal. A/D converter 52 converts an output 62 of S/H circuit 51 into data having three levels or more and outputs voltage selecting signal 63 to voltage selector 53. Output timing signal is supplied from controller 54 to voltage selector 53. Also supplied to selector 53 is voltage selection signal 68 defining that region of the recording medium in which the data representing a reference amount of light will be recorded. (This reference amount of light will be compared with the amount of light reflected from each information-recorded region of the optical information recording medium in order to reproduce the information from the recording medium.) Voltage selector 53 outputs multilevel recording signal 64. Recording signal 64 is output to optical modulating element driver 26 described above. Controller 54 controls S/H circuit 51, A/D converter 52, and voltage selector 53 in accordance with the data-transfer control signal supplied from information source detecting signal (sync signal) 65 of sync marks etc. formed in the optical disk.

Figure 7:
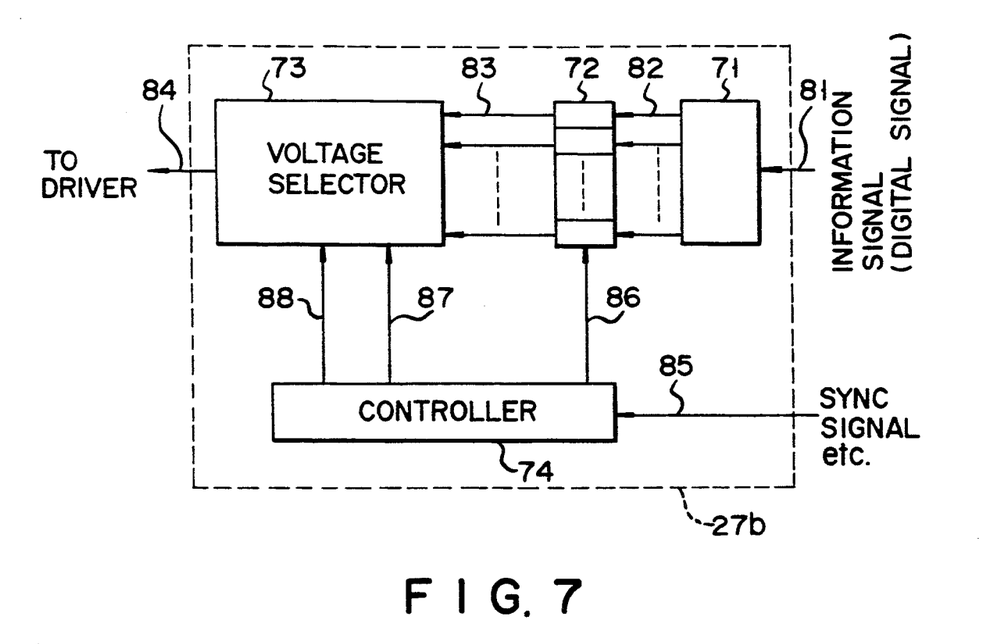

When the input information signal is a digital signal, recording signal generator 27b comprises decoder 71, latch circuit 72, voltage selector 73, and controller 74, as shown in FIG. 7. Decoder 71 decodes information signal 81. When decoding is performed in units of, e.g., 2 bits, the decoded signal is a four-level signal, and 4 bits, the decoded signal is a sixteen-level signal. Latch circuit 72 latches output 82 of decoder 71 in accordance with latch signal 86 output from controller 74 and supplies voltage selecting signal 83 to voltage selector 73. Voltage selector 73 receives signal 83 from latch circuit 72, output timing signal 87 and voltage selection signal 88, which has been supplied from controller 74 and defines that recording region of the recording medium for recording the data representing the reference amount of light, and outputs multilevel recording signal 84 same as signal 64. Recording signal 84 is output to driver 26 in the same manner as described above. Controller 74 has a function similar to that of controller 54 described above.

Figure 8:
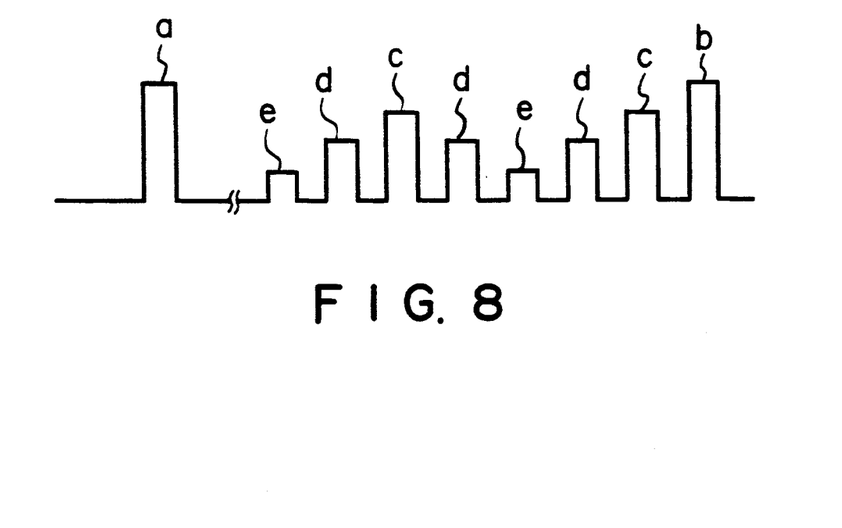
FIG. 8 shows a signal waveform of a recording signal formed by the recording signal generator.
Figure 9:
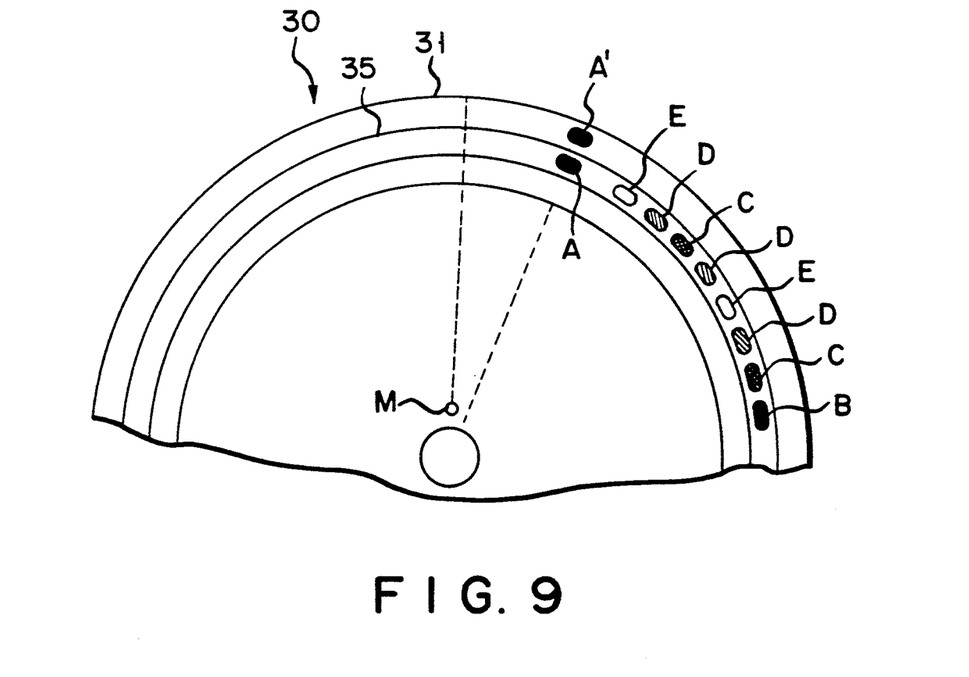
FIG. 9 is a partial plan view of an optical disk having recording portions formed by the method of the present invention.

Recording signal 64 or 84 has, e.g., an analog signal waveform as shown in FIG. 8. FIG. 8 represents a 4-level recording signal. In this figure, reference symbol a denotes a pulse of the recording signal defining that region of the recording medium, for recording the data showing the reference amount of light. Other pulses, which defines that region of the recording medium, for recording the data showing the reference amount of light, are denoted by b, c, d and e in the order of high voltage level to low voltage level. The output power of the laser beam irradiated onto recording layer 31 is controlled in accordance with recording signal 64 or 84. As a result, region A in which the reference light-amount data is recording and information recorded portions B to E having optical characteristics corresponding to recording signal pulses b to e are formed in recording layer 31, as shown in FIG. 9. Note that in FIG. 9, symbol A' denotes the region of the recording medium, which has been defined in order to record the reference light-amount data in preparation of recording of information in the first track; and M, a sync mark described above. Although concentric pregrooves 35 are formed in recording layer 31 in FIG. 9, helical pregrooves can be formed. The pulse of the maximum level defines region A. Another pulse, such as the pulse of the minimum level or any other pulse (except for the one of the maximum level), can be used to define region A.

Recording layer 31 of optical disk 30 will be described in detail. As described above recording layer 31 is made of specific material so that the optical characteristics of its laser beam irradiated portion can be changed in accordance with the output power of the emitted laser beam.

A material having optical characteristics of high temperature dependency is preferable as such a material. More specifically, as the material of recording layer, (1) a phase transition type material whose phase can change between crystalline and amorphous phases by laser beam radiation; (2) an organic material whose molecular structure is changed by laser beam radiation; and (3) a magnetic material which lowers coercive force by laser beam radiations and is magnetically inverted easily by an external magnetic field can be used.

The examples of material (1) include Te-O system, Te-O-Ge-Sn system, Sn-Te-Se system, Ga-Te-Se system, In-Sb-Se system, Ge-Te system, $Sb_2Se$ system, In-Se-Tl-Co system, In-Sb-Te system and Ge-Sb-Te system. When a recording layer is made of such a material, normally it is first crystallized. Then, upon radiation with a laser beam, an amorphous phase is formed in the irradiated portion of the recording layer. The optical characteristics, e.g., the transmittance of the amorphous phase, are different from those of the crystalline phase. Therefore, when an amorphous phase is formed, information is recorded.

Figure 10:
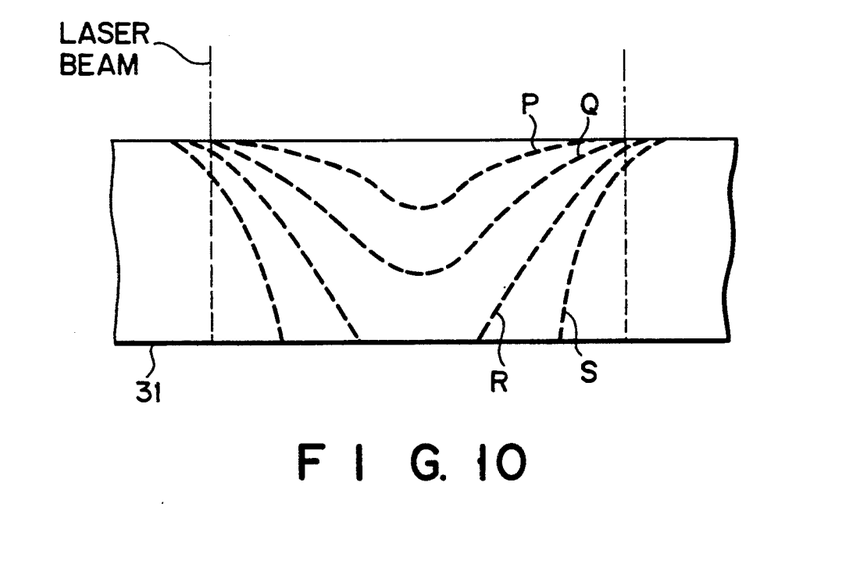
FIG. 10 shows the changing region of the optical characteristics of the recording layer.

The larger the output power of the emitted laser beam, i.e., the higher the temperature, the larger the formed amount of the amorphous phase. More specifically, assume that recording layer 31 is irradiated with a laser beam, as shown in FIG. 10. When the laser beam output power is low, a region of the irradiated portion above the boundary indicated by broken line P becomes amorphous. As the laser beam output power is increased, the boundary is moved from P to Q, R, and then S, and the amorphous region is sequentially widened. Therefore, when the laser beam output power is adjusted, it is possible to select any value for the volume ratio between the crystalline phase and the amorphous phase, which form each recording region, that is, the average transmission of each recording region, and information signals having different levels can be effectively recorded.

As the material (2), photochromic material is well known, and the examples of photochromic material include (a) a material which is cis-trans isomerized; (b) a material exhibiting tautomerism; (c) a material in which heterolytic fission occurs; (d) a material in which homolytic fission occurs; and (e) a material in which a redox reaction occurs upon laser beam radiation. When such a molecular structural change occurs, the optical characteristics are changed, and thus information can be recorded. Material (a) can be azobenzene; material (b) can be nitrobenzyl; material (c) can be spiropytene (which is converted to merocyan upon light radiation); material (d) can be bis(triphenylimidazole); and material (e) can be thianine, viologen, and the like.

One of these materials is selected in accordance with the wavelength of the laser beam. Nonetheless, the size of any region (whose molecular structrue is to be changed) of the medium made of the selected material can be changed by adjusting the laser beam output power, as in the case where the recording layer is made of the phase-transition material. Therefore, a multilevel information signal can be recorded.

The examples of material (3) include a Bi-substituted garnet such as $Bi_2DyFe_4GaO_{12}$, a spinel such as $CoFe_2O_4$, and a hexagonal ferrite such as $BaGe_{12}O_{19}$. Since these materials have high magnetic anisotropy, a recording layer is made of one of these materials. When the recording layer is irradiated with a laser beam and the irradiated portion is set at a temperature near the Curie temperature or higher than the Curie temperature in order to invert its magnetization direction by an external magnetic field, information can be recorded. Since these materials have a small optical absorption factor, their transmittance is high. The thickness of a recording layer can be made as thick as tens to hundreds of micrometers, and the total Faraday rotating angle ($\theta F$) of the magnetically inverted portion can be increased. Therefore, a read signal can be made large.

Figure 11A:
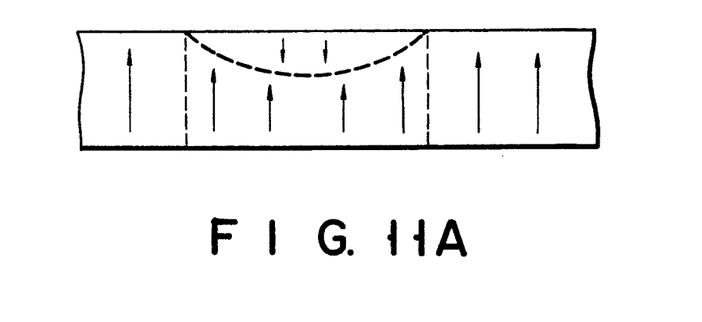
FIGS. 11A and 11B are views respectively showing the magnetization directions of the laser beam irradiated portion of the recording layer made of a magnetic material.
Figure 11B:
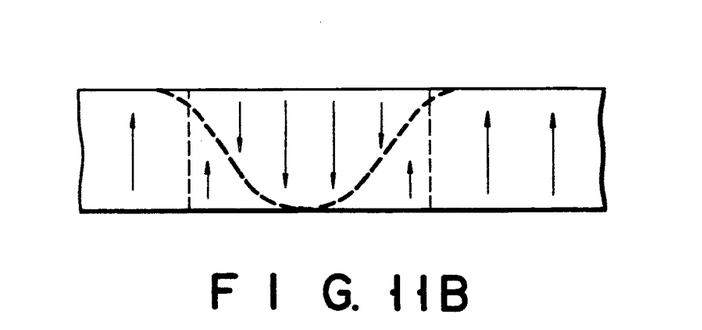

When the output power of the laser beam emitted onto such a recording layer is changed, the size of the region corresponding to a temperature higher than the Curie point is changed, and accordingly the amount of magnetic inversion by the external magnetic field is changed. More specifically, when the laser beam output power is small, the amount of magnetic inversion is small, as shown in FIG. 11A, and the synthetic magnetization direction of the laser beam irradiated portion is the same as that of the surrounding portion and the intensity of the magnetization is slightly lower than that of the surrounding portion. In contrast to this, when the laser beam output power is large, the amount of magnetic inversion is large, as shown in FIG. 11B, and the synthetic magnetization direction of the laser beam irradiated portion is opposite to that of the surrounding portion. Since these materials have a high transmittance, a thick recording layer can be formed using them, as described above. Therefore, when the laser beam irradiation output is changed, the magnetization inversion amount can be greatly changed, and this change can be detected as a change in Faraday rotating angle. As a result, when the laser beam output power is set to have a plurality of levels, a multilevel information signal can be effectively recorded.

$Bi_2DyFe_4GaO_{12}$ described here have a magnetic anisotropy constant of up to $10^4$ erg/cc, and an optical absorption factor and a Faraday rotating angle of up to $0.1/\mu m$ and 1 to $2°/\mu m$, respectively when $\lambda = 800$ nm. $CoFe_2O_4$ has a magnetic anisotropy constant of $10^4$ to $10^6$ erg/cc, an optical absorption factor of up to $1/\mu m$, and a Faraday rotating angle of $2°$ to $3°/\mu m$. $BaFe_{12}O_{19}$ has a magnetic anisotropy constant of up to $10^6$ erg/cc, an optical absorption factor of up to $1/\mu m$, and a Faraday rotating angle of 0.6 to $1°/\mu m$.

Figure 12A:
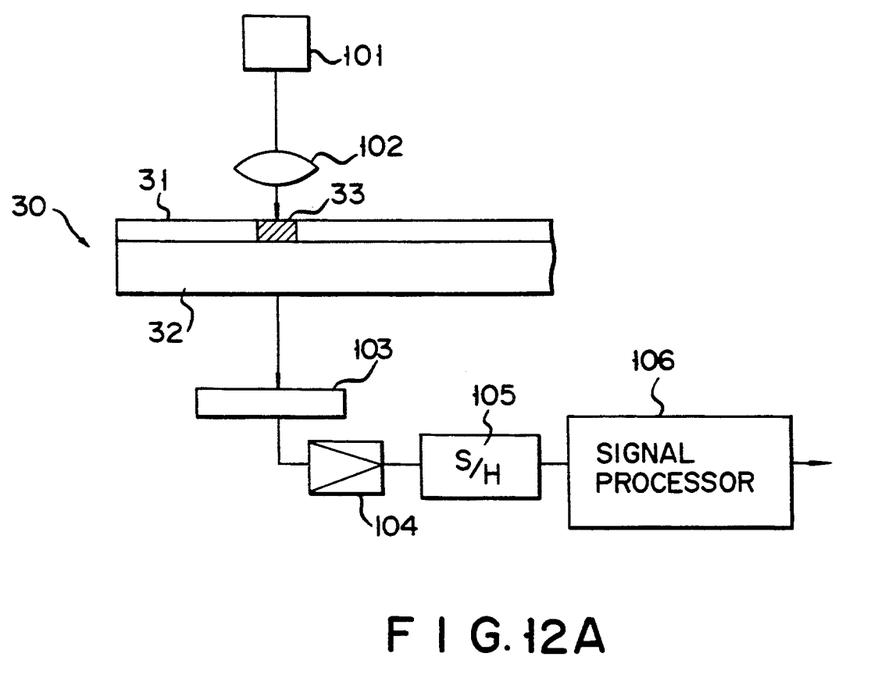
FIGS. 12A and 12B schematically show arrangements, respectively, of a reading system for reading the information recorded in accordance with this embodiment.
Figure 12B:
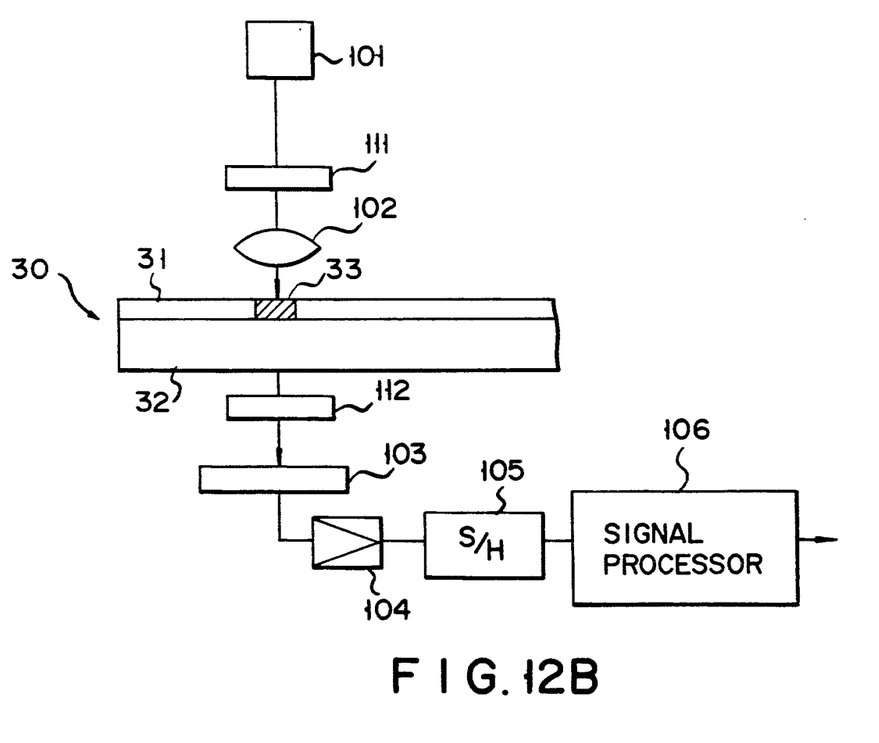

A reading system for reading information recorded in the above manner will now be described. FIGS. 12A and 12B schematically show reading systems, respectively. The system shown in FIG. 12A is used when recording layer 31 is made of a phase transition type or a photochromic material, and the system shown in FIG. 12B is used when recording layer 31 is made of a magnetic material.

Figure 13:
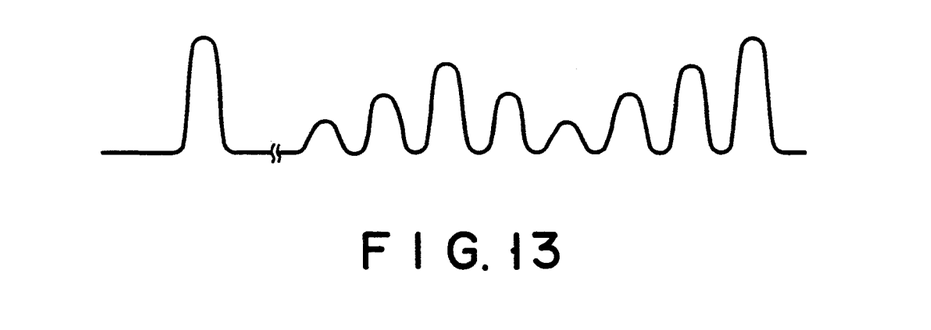
FIG. 13 shows the waveform of a signal detected by the optical detector of the reading system.

When recording layer 31 is made of photochromic material, a laser beam having a wavelength different from that of the recording laser beam must be applied. When layer 31 is made of any other material, laser beam source 101 can be of the same type as recording laser beam source 21 described above. Beam source 101 emits a continuous laser beam of a lower output power than that used for recording. The laser beam is focused by focusing lens 102 to irradiate optical disk 30 which is being rotated at a predetermined speed. The laser beam passes disk 30 and reaches optical detector 103 In this case, when the laser beam output power for forming recorded portion 33 is changed, recorded portion 33 has multilevel optical characteristics, as described above. Therefore, the optical transmittance of each recorded portion and that of non-recorded portion are detected by optical detector 103 and a read signal as shown in FIG. 13 which substantially corresponds to the recording signal (shown in FIG. 8) is output. When recording layer 31 is made of a magnetic material, the laser beam emitted from laser beam source 101 passes polarizer 111, is focused by focusing lens 102, is transmitted through optical disk 30, and reaches optical detector 103 through analyzer 112, as shown in FIG. 12B. In this case, the amount of light reaching detector 103 varies, depending on the Faraday rotation angle of each recording region.

Figure 14:
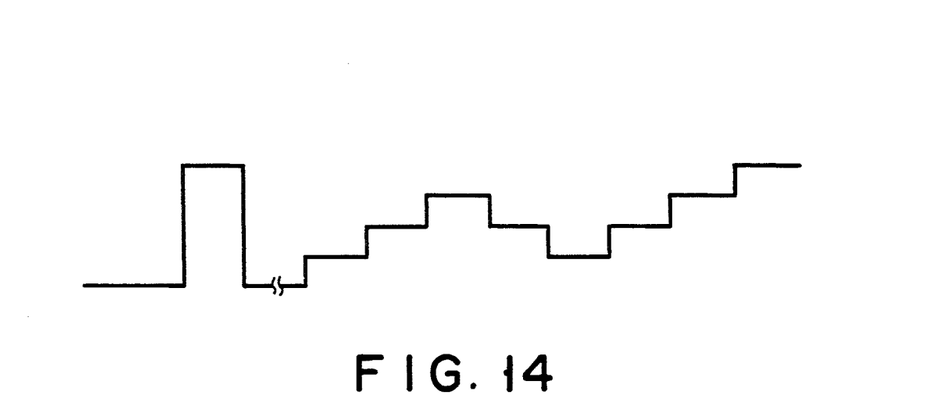
FIG. 14 shows the waveform of a signal obtained by amplifying the output signal from the optical detector and processing the amplified signal by a sample/hold circuit.

An output signal from optical detector 103 is amplified by amplifier 104 and sampled and held by sample/hold circuit 105. Thus, a signal as shown in FIG. 14 is obtained. The signal is then A/D-converted by signal processor 106 as required, and corrected to have a desired signal waveform and output.

Figure 15:
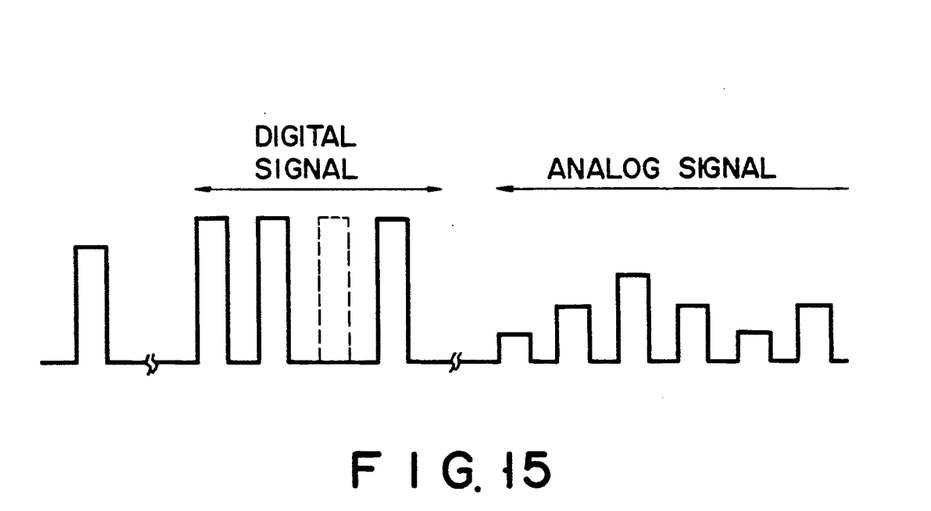
FIG. 15 shows the waveform of a recording signal when both analog and digital signals are used.

In the embodiment, a case wherein the recording signal is an analog signal and a case wherein the recording signal is a digital signal are separately described. However, both analog and digital signals can be used together as shown in FIG. 15.

Figure 16:
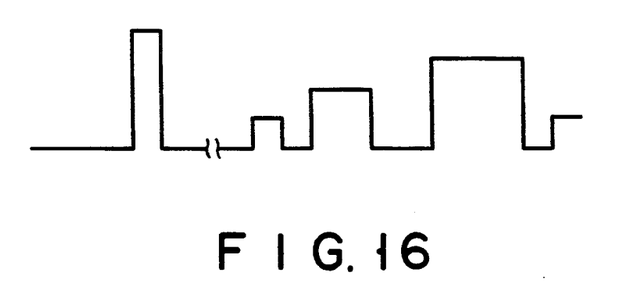
FIG. 16 shows the waveform of a recording signal having a variable pulse level and a variable pulse width.

In the above embodiment, only the level of the pulse is variable. However, the pulse width, i.e., the optical beam radiation time is also variable, as shown in FIG. 16. In this case, the information density can be further increased.

Figure 17:
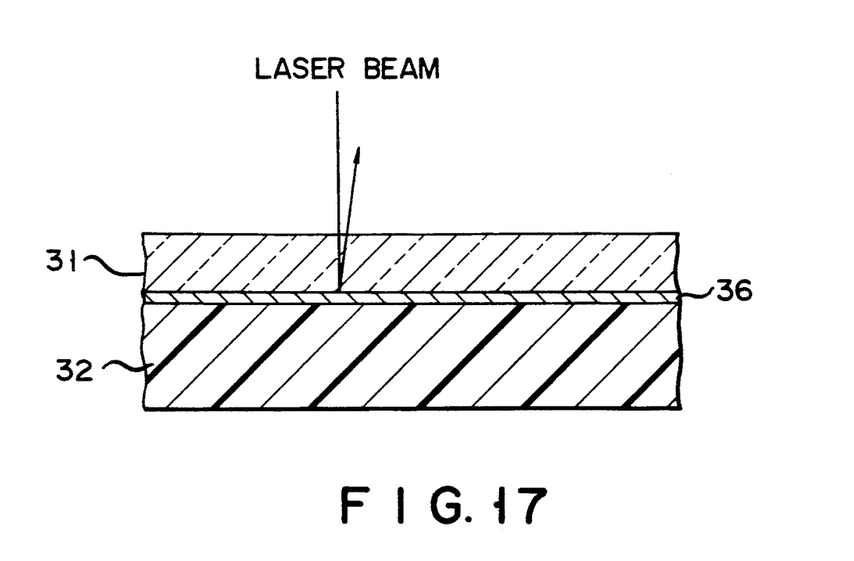
FIG. 17 is a sectional view of a modification of an optical disk used in this embodiment.

In the above embodiment, information reading is performed using a laser beam which has passed recording layer 31 and substrate 32 of optical disk 30. However, reflecting layer 36 may be provided between layer 31 and substrate 32 and light reflected by layer 36 may be detected, as shown in FIG. 17. In this case, since a light amount in which reflected and transmitted light are superposed can be obtained, the read signal magnitude can be further increased. The reflecting layer is useful particularly when the recording layer is made of the phase-transition material or magnetic material.

Separate laser beam sources are provided for recording and reading. However, recording and reading can be performed by a single laser beam source.

What is claimed is:
1. A method of recording information on an optical information recording medium having a recording layer, the recording layer being made of a material in which phase transition can occur upon radiation of an optical beam by means of a heat mode, the method comprising:

selectively irradiating said recording layer with an optical beam onto sections of the recording layer in which information is to be recorded;

changing the output power of the optical beam irradiating the sections of the recording layer in a multilevel manner in accordance with information to be recorded; and forming each of the sections of the recording layer in which information is to be recorded in such a manner as to exhibit a selected one of at least three different phase transition amounts in accordance with the output power of the optical beam, wherein the optical characteristics of the beam irradiated sections of the recording layer are changed according to the power of the irradiated optical beam and exhibit selected ones of at least three different optical characteristics corresponding to the information to be recorded.

2. A method according to claim 1, including forming in said recording medium a reference recording region for recording data representing a reference amount of light to be compared with an amount of light applied from each information-recorded section of the optical information recording medium, in order to reproduce the information from said recording medium.

3. A method according to claim 2, wherein said reference recording region is formed before an information recording region is formed.

4. A method according to claim 1, wherein the information to be recorded includes digital information.

5. A method according to claim 1, wherein the information to be recorded includes analog information.

6. A method according to claim 5, wherein recording of the analog information is performed by emitting an optical beam of all of the multilevels or an optical beam of plural levels excepting a maximum level among said multilevels.

7. A method according to claim 1, wherein the information to be recorded includes digital information and analog information.

8. A method according to claim 7, wherein recording of the digital information is performed by emitting an optical beam of a maximum level; and recording of the analog information is performed by emitting an optical beam of all of the multilevels or an optical beam of plural levels excepting a maximum level among said multilevels.

9. A method according to claim 1, wherein the optical beam emitted onto the information recording medium has an output power and a radiation time that are variable in accordance with the information to be recorded.

10. An optical information recording apparatus for recording information in a recording layer of an information recording medium capable of exhibiting a selected one of at least three different optical states in accordance with the power of an irradiating beam, comprising:

(a) recording signal output means for outputting an information signal to be recorded in the form of a recording signal obtained by converting the information signal into a plurality of signal levels;

(b) optical beam output means, driven by the recording signal output from said recording signal output means, for outputting an optical beam of an output power corresponding to the recording signal; and (c) optical means for focusing the optical beam output from said optical beam output means onto said information recording medium and for causing said recording layer to exhibit selected ones of at least three different optical states in accordance with said information signal;

wherein the recording layer of the information recording medium is made of a material in which phase transition can occur upon radiation of the optical beam, and wherein a change in degree of the phase transition varies in accordance with a change in output power of the optical beam.

11. An apparatus according to claim 10, wherein said optical beam output means comprises an optical beam generating unit and switching means for switching a drive current of said generating unit in accordance with the recording signal.

12. An apparatus according to claim 10, wherein said optical beam output means comprises an optical beam generating unit and optical modulating means, arranged between said optical beam generating unit and the information recording medium, for controlling a transmitted light amount of the optical beam generated by said optical beam generating unit in accordance with the recording signal.

13. A method of recording information recording medium having recording layer, the recording layer being made of a magnetic material whose magnetization of the optical beam, the method comprising:

selectively irradiating said recording layer with an optical beam onto sections of the recording layer in which information is to be recorded;

changing the output power of the optical beam irradiating the sections of the recording layer in a multilevel manner in accordance with information to be recorded; and forming each of the sections of the recording layer in which information is to be recorded in such a manner as to exhibit a selected one of at least three different change amount of the magnetization direction changes in accordance with the output power of the optical beam, wherein the optical characteristics of the beam irradiated sections of the recording layer are changed according to the power of the irradiated optical beam and exhibit selected ones of at least three different optical characteristics corresponding to the information to be record.

14. A method according to claim 13, including forming in said recording medium a reference recording region for recording data representing a reference amount of light to be compared with an amount of light applied from each information-recorded section of the optical information recording medium, in order to reproduce the information from said recording medium.

15. A method according to claim 14, wherein said reference recording region is formed before an information recording region is formed.

16. A method according to claim 13, wherein the information to be recorded includes digital information.

17. A method according to claim 13, wherein the information to be recorded includes analog information.

18. A method according to claim 17, wherein recording of the analog information is performed by emitting an optical beam of all of the multilevels or an optical beam of plural levels excepting a maximum level among said multilevels.

19. A method according to claim 13, wherein the information to be recorded includes digital information and analog information.

20. A method according to claim 17, wherein recording of the digital information is performed by emitting an optical beam of a maximum level; and recording of the analog information is performed by emitting an optical beam of all of the multilevels or an optical beam of plural levels excepting a maximum level among said multilevels.

21. A method according to claim 13, wherein the optical beam emitted onto the information recording medium has an output power and a radiation time that are variable in accordance with the information to be recorded.

22. An optical information recording apparatus for recording information in a recording layer of an information recording medium capable of exhibiting a selected one of at least three different optical states in accordance with the power of an irradiating beam, comprising:
 (a) recording signal output means for outputting an information signal to be recorded in the form of a recording signal obtained by converting the information signal into a plurality of signal levels;
 (b) optical beam output means, driven by the recording signal output from said recording signal output means, for outputting an optical beam of an output power corresponding to the recording signal; and
 (c) optical means for focusing the optical beam output from said optical beam output means onto said information recording medium and for causing said recording layer to exhibit selected ones of at least three different optical states in accordance with said information signal;
 wherein the recording layer of the information recording medium is made of a magnetic material having a magnetization direction that changes upon radiation of the optical beam, and wherein a degree of change of the magnetization direction varies in accordance with a change in output power of the optical beam.

23. An apparatus according to claim 22, wherein said optical beam output means comprises an optical beam generating unit and switching means for switching a drive current of said generating unit in accordance with the recording signal.

24. An apparatus according to claim 22, wherein said optical beam output means comprises an optical beam generating unit and optical modulating means, arranged between said optical beam generating unit and the information recording medium, for controlling a transmitted light amount of the optical beam generated by said optical beam generating unit in accordance with the recording signal.

* * * * *